(12) United States Patent
Horn et al.

(10) Patent No.: US 8,902,867 B2
(45) Date of Patent: Dec. 2, 2014

(54) FAVORING ACCESS POINTS IN WIRELESS COMMUNICATIONS

(75) Inventors: Gavin B. Horn, La Jolla, CA (US);
Fatih Ulupinar, San Diego, CA (US);
Parag A. Agashe, San Diego, CA (US);
Rajat Prakash, La Jolla, CA (US);
Manoj M. Deshpande, San Diego, CA (US); Sanjiv Nanda, Ramona, CA (US);
Jen Mei Chen, San Diego, CA (US);
Francesco Pica, San Diego, CA (US);
Nathan E. Tenny, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 973 days.

(21) Appl. No.: 12/269,619

(22) Filed: Nov. 12, 2008

(65) Prior Publication Data

US 2009/0137249 A1 May 28, 2009

Related U.S. Application Data

(60) Provisional application No. 60/988,631, filed on Nov. 16, 2007, provisional application No. 60/988,641, filed on Nov. 16, 2007, provisional application No. 60/988,649, filed on Nov. 16, 2007, provisional application No. 61/086,223, filed on Aug. 5, 2008, provisional application No. 61/086,337, filed on Aug. 5, 2008.

(51) Int. Cl.
*H04W 4/00* (2009.01)
*H04W 36/00* (2009.01)
*H04W 84/04* (2009.01)

(52) U.S. Cl.
CPC ........ *H04W 36/0083* (2013.01); *H04W 84/045* (2013.01)
USPC ....................................... 370/338; 455/435.2

(58) Field of Classification Search
CPC ..... H04W 48/20; H04W 36/30; H04W 48/16; H04W 36/0083; H04W 36/08
USPC ................ 370/338, 331; 455/435.2, 436, 437
See application file for complete search history.

(56) References Cited

U.S. PATENT DOCUMENTS 5,535,424 A 7/1996 De Seze et al.
5,640,677 A * 6/1997 Karlsson ...................... 455/434

(Continued)

FOREIGN PATENT DOCUMENTS

CN 1110457 A 10/1995
CN 1415143 4/2003

(Continued)

OTHER PUBLICATIONS

3GPP TS 36.304 v8.0.0: "3rd Generation Partnership Project; Technical Specification Group Radio Access Network; Evolved Universal Terrestrial Radio Access (E-UTRA); User Equipment (UE) procedures in idle mode (Realease 8)," [Online] (Dec. 1, 2007), pp. 1-27, XP002524390.

(Continued)

*Primary Examiner* — Hoang-Chuong Vu

(57) ABSTRACT

Systems and methodologies are described that facilitate applying offsets and/or selectable hysteresis values to favor access points in cell reselection. In measuring and ranking surrounding access points in reselection, offsets can be applied to favorable access points to facilitate cell reselection thereto. The offset can positively affect measurements, and thus ranking as well, in some cases. Negative offsets can also be applied to lower measurements (and thus ranking) of some access points. Moreover, hysteresis values can be applied in measuring current cells to prevent frequent reselection. The hysteresis values can be selected based on a type of the current cell or related access point to expand the coverage area where desired. Thus, where the current access point is favorable, a larger hysteresis can be added to measurements related to the current access point.

26 Claims, 10 Drawing Sheets

(56) References Cited

U.S. PATENT DOCUMENTS

| | | | |
|---|---|---|---|
| 5,722,072 A | 2/1998 | Crichton et al. | |
| 5,778,316 A * | 7/1998 | Persson et al. | 455/434 |
| 5,896,373 A * | 4/1999 | Mitts et al. | 370/331 |
| 5,930,710 A * | 7/1999 | Sawyer et al. | 455/436 |
| 6,067,460 A | 5/2000 | Alanara et al. | |
| 6,151,484 A | 11/2000 | Ramesh | |
| 6,516,193 B1 | 2/2003 | Salmela et al. | |
| 6,529,491 B1 | 3/2003 | Chang et al. | |
| 6,542,744 B1 | 4/2003 | Lin | |
| 6,717,925 B1 | 4/2004 | Leppisaari et al. | |
| 6,751,460 B2 * | 6/2004 | Korpela et al. | 455/449 |
| 6,792,284 B1 | 9/2004 | Dalsgaard et al. | |
| 7,047,009 B2 | 5/2006 | Laroia et al. | |
| 7,379,739 B2 | 5/2008 | Rajkotia et al. | |
| 7,480,265 B2 * | 1/2009 | Cromer et al. | 370/311 |
| 7,512,110 B2 | 3/2009 | Sayeedi et al. | |
| 7,706,793 B2 | 4/2010 | Zhang | |
| 7,742,498 B2 | 6/2010 | Barzegar et al. | |
| 7,869,792 B1 | 1/2011 | Zhou et al. | |
| 7,925,259 B2 | 4/2011 | Nylander et al. | |
| 7,929,970 B1 | 4/2011 | Gunasekara et al. | |
| 7,937,086 B2 | 5/2011 | Chen et al. | |
| 8,032,153 B2 | 10/2011 | Dupray et al. | |
| 8,737,229 B2 * | 5/2014 | Khandekar et al. | 370/237 |
| 8,737,295 B2 | 5/2014 | Horn et al. | |
| 2002/0019231 A1 * | 2/2002 | Palenius et al. | 455/437 |
| 2002/0168982 A1 | 11/2002 | Sorokine et al. | |
| 2003/0051132 A1 | 3/2003 | Kobayashi et al. | |
| 2003/0134642 A1 * | 7/2003 | Kostic et al. | 455/450 |
| 2003/0220075 A1 | 11/2003 | Baker et al. | |
| 2004/0009779 A1 | 1/2004 | Qu et al. | |
| 2004/0082328 A1 | 4/2004 | Japenga et al. | |
| 2004/0136340 A1 | 7/2004 | Sanchez et al. | |
| 2004/0198220 A1 * | 10/2004 | Whelan et al. | 455/41.1 |
| 2004/0202131 A1 | 10/2004 | An et al. | |
| 2005/0037798 A1 | 2/2005 | Yamashita et al. | |
| 2005/0099998 A1 | 5/2005 | Semper | |
| 2005/0124344 A1 | 6/2005 | Laroia et al. | |
| 2005/0202823 A1 | 9/2005 | Shaheen et al. | |
| 2005/0245260 A1 | 11/2005 | Nielsen et al. | |
| 2006/0025127 A1 * | 2/2006 | Cromer et al. | 455/432.1 |
| 2006/0040700 A1 * | 2/2006 | Roberts et al. | 455/525 |
| 2006/0148479 A1 | 7/2006 | Park et al. | |
| 2006/0173976 A1 * | 8/2006 | Vincent et al. | 709/220 |
| 2006/0184680 A1 | 8/2006 | Ruutu et al. | |
| 2006/0189308 A1 | 8/2006 | Kurata et al. | |
| 2006/0233150 A1 | 10/2006 | Cherian | |
| 2006/0258354 A1 | 11/2006 | Ul Haq | |
| 2006/0268746 A1 | 11/2006 | Wijting et al. | |
| 2006/0268800 A1 | 11/2006 | Sugaya et al. | |
| 2006/0276201 A1 | 12/2006 | Dupray | |
| 2007/0054666 A1 * | 3/2007 | Choi | 455/434 |
| 2007/0097938 A1 | 5/2007 | Nylander et al. | |
| 2007/0098053 A1 | 5/2007 | Rinne et al. | |
| 2007/0104166 A1 | 5/2007 | Rahman et al. | |
| 2007/0232307 A1 | 10/2007 | Ibrahim et al. | |
| 2007/0249291 A1 | 10/2007 | Nanda et al. | |
| 2007/0250713 A1 | 10/2007 | Rahman et al. | |
| 2008/0004025 A1 | 1/2008 | Lee | |
| 2008/0039099 A1 | 2/2008 | An et al. | |
| 2008/0069065 A1 * | 3/2008 | Wu et al. | 370/340 |
| 2008/0101301 A1 | 5/2008 | Thomas et al. | |
| 2008/0132239 A1 | 6/2008 | Khetawat et al. | |
| 2008/0192696 A1 | 8/2008 | Sachs et al. | |
| 2008/0267114 A1 | 10/2008 | Mukherjee et al. | |
| 2008/0287134 A1 | 11/2008 | Catovic et al. | |
| 2008/0299975 A1 | 12/2008 | Sanchez et al. | |
| 2008/0305801 A1 | 12/2008 | Burgess et al. | |
| 2009/0047954 A1 | 2/2009 | Tenny et al. | |
| 2009/0047955 A1 | 2/2009 | Frenger et al. | |
| 2009/0047960 A1 | 2/2009 | Gunnarsson et al. | |
| 2009/0052395 A1 | 2/2009 | Bao et al. | |
| 2009/0086672 A1 * | 4/2009 | Gholmieh et al. | 370/329 |
| 2009/0124284 A1 * | 5/2009 | Scherzer et al. | 455/552.1 |
| 2009/0129327 A1 | 5/2009 | Horn et al. | |
| 2009/0129338 A1 | 5/2009 | Horn et al. | |
| 2009/0135784 A1 | 5/2009 | Horn et al. | |
| 2009/0137228 A1 | 5/2009 | Horn et al. | |
| 2009/0252113 A1 | 10/2009 | Take | |
| 2009/0253432 A1 | 10/2009 | Willey et al. | |
| 2009/0280819 A1 | 11/2009 | Brisebois et al. | |
| 2009/0285113 A1 * | 11/2009 | Yavuz et al. | 370/252 |
| 2010/0008230 A1 * | 1/2010 | Khandekar et al. | 370/237 |
| 2010/0027510 A1 | 2/2010 | Balasubramanian et al. | |
| 2010/0029274 A1 | 2/2010 | Deshpande et al. | |
| 2010/0110945 A1 | 5/2010 | Koskela et al. | |
| 2010/0184439 A1 | 7/2010 | Chen et al. | |
| 2010/0227645 A1 | 9/2010 | Keevill et al. | |
| 2010/0240367 A1 | 9/2010 | Lee et al. | |
| 2010/0240368 A1 | 9/2010 | Fox et al. | |
| 2010/0323663 A1 | 12/2010 | Vikberg et al. | |
| 2011/0263260 A1 | 10/2011 | Yavuz et al. | |
| 2013/0065594 A1 | 3/2013 | Somasundaram et al. | |
| 2014/0045495 A1 | 2/2014 | Deshpande et al. | |

FOREIGN PATENT DOCUMENTS

| | | |
|---|---|---|
| CN | 1675954 A | 9/2005 |
| CN | 1675956 A | 9/2005 |
| CN | 1701584 A | 11/2005 |
| CN | 1842210 A | 10/2006 |
| CN | 1964522 A | 5/2007 |
| CN | 101015221 A | 8/2007 |
| DE | 19510256 | 9/1995 |
| EP | 0589552 | 3/1994 |
| EP | 1670179 | 6/2006 |
| EP | 1699253 | 9/2006 |
| EP | 1717993 | 11/2006 |
| EP | 1775976 | 4/2007 |
| EP | 1835780 | 9/2007 |
| EP | 2077690 | 7/2009 |
| JP | 8501430 | 2/1996 |
| JP | 2003506960 A | 2/2003 |
| JP | 2003116162 A | 4/2003 |
| JP | 2004159304 A | 6/2004 |
| JP | 2004166273 A | 6/2004 |
| JP | 2004260824 A | 9/2004 |
| JP | 2006148836 A | 6/2006 |
| JP | 2007104417 A | 4/2007 |
| JP | 2007534227 A | 11/2007 |
| JP | 2009504050 A | 1/2009 |
| JP | 2009510973 A | 3/2009 |
| KR | 100711531 | 4/2007 |
| RU | 2145774 C1 | 2/2000 |
| RU | 2199834 C2 | 2/2003 |
| RU | 2005129268 A | 3/2007 |
| RU | 2308810 | 10/2007 |
| WO | WO-9502309 A1 | 1/1995 |
| WO | WO02080600 | 10/2002 |
| WO | WO02087275 | 10/2002 |
| WO | WO03009633 | 1/2003 |
| WO | WO2004019643 | 3/2004 |
| WO | WO2004054310 | 6/2004 |
| WO | WO2005065214 A2 | 7/2005 |
| WO | WO2005122621 A1 | 12/2005 |
| WO | WO2007015066 A2 | 2/2007 |
| WO | WO2007015071 A2 | 2/2007 |
| WO | 2007040452 | 4/2007 |
| WO | WO2007040454 A2 | 4/2007 |
| WO | WO2007075954 | 7/2007 |
| WO | WO2007080490 | 7/2007 |
| WO | WO2007096763 A2 | 8/2007 |
| WO | WO2007097672 | 8/2007 |
| WO | WO 2007097672 A1 * | 8/2007 |
| WO | WO2007097673 | 8/2007 |
| WO | WO2008030956 | 3/2008 |
| WO | WO2008124282 | 10/2008 |
| WO | WO2009007720 | 1/2009 |
| WO | WO2009053710 | 4/2009 |

OTHER PUBLICATIONS

ETSI TS 125.304 V7.1.0: "Universal Mobile Telecommunications System (UMTS); User Equipment (UE) procedures in idle mode and

(56) References Cited

OTHER PUBLICATIONS procedures for cell reselection in connected mode (3GPP TS 25.304 version 7.1.0 Release 7)" ETSI Standards, Sophia Antipolis Cedex, France, (Dec. 1, 2006), XP014039981.

International Search Report and the Written Opinion—PCT/US2008/083466, International Search Authority—European Patent Office—Mar. 20, 2009.

Jung, Young-Ho et al: "PN offset Planning for Synchronous CDMA Based Fiber-Optic Microcellular Systems," Vehicular Technology Conference Proceedings, 2000. Internet Citation, (May 2000), pp. 2275-2279, XP002480275 [retrieved on May 15, 2000] paragraphs [0001]-[00VI], doi: 10.1109/VETECS.2000.851678.

Qualcomm Europe: "Implicit Priority for CSG cells," 3GPP TSG-RAN WG2 #63bis, R2-086586, (Nov. 10, 2008), XP002557108.

Qualcomm Europe: "Linger timer for HeNB reselection to improve standby time of UE in mobility situations," 3GPP Draft TSG-RAN WG2 meeting #63; R2-084155, 3rd Generation Partnership Project (3GPP), Jeju, Korea; (Aug. 12, 2008), XP050319291.

Qualcomm Europe: "Linger Timer for HNB Cell Reselection," 3GPP Draft TSG-RAN WG2 meeting #63; R2-084342, 3rd Generation Partnership Project (3GPP), Jeju, Korea, (Aug. 22, 2008), XP050319418.

Qualcomm Europe: "Parameter for HNB White List Cell Selection," 3GPP Draft TSG-RAN WG2 meeting #63; R2-084552, 3rd Generation Partnership Project (3GPP), Jeju, Korea (Aug. 18, 2008), XP050319589.

Qualcomm Europe: "UTRA HNB Idle Mode (Re)selection," 3GPP Draft TSG-RAN WG2 #62bis; R2-084347, 3rd Generation Partnership Project (3GPP), Jeju, Korea (Aug. 18, 2008), XP050319423.

Rapporteur (Huawei): "Email report on Home-(e)NB mobility, main issues [63_LTE_C01,]" 3GPP Draft TSG-RAN2 Meeting #63bis; R2-085705, 3rd Generation Partnership Project (3GPP), Prague, Czech Republic; (Oct. 1, 2008), XP050320478.

3GPP TR 24.801: "Pseudo-CR on Allowed CSG List update," 3GPP TSG CT WG1 meeting #55; C2-083427, v 1.1.1, Budapast, Hungary, Aug. 18-22, 2008.

ASUSTeK, "CSG related system information and CSG subscription information", 3GPP TSG-RAN WG2 #60, R2-075133, Nov. 9, 2007.

Ericsson, "Idle state access restriction for CSGs", 3GPP TSG-RAN WG2 #60, Tdoc R2-074684, Nov. 9, 2007, <URL:http://www.3gpp.org/ftp/tsg_ran/WG2_RL2/TSGR2_60/Docs/R2-074684.zip>.

NTT Docomo, et al., "CSG with limited open access" 3GPP Draft; R2-075150 CSG With Limited Open Access, 3rd Generation Partnership Project (3GPP), Mobile Competence Centre ; 650, Route Des Lucioles ; F-06921 Sophia-Antipolis Cedex ; France, vol. RAN WG2, No. Jeju; Nov. 12, 2007, XP050137597 [retrieved on Nov. 12, 2007] the whole document.

Vodafone, "GERAN to LTE Handover: Home Cell Deployment Considerations", 3GPP Workshop GERAN/RAN, TDoc GR-070020, Sep. 28, 2007.

Vodafone Group: "Signalling on a CSG Cell" 3GPP Draft; R2-072831, 3rd Generation Partnership Project (3GPP), Mobile Competence Centre ; 650, Route Des Lucioles ; F-06921 Sophia-Antipolis Cedex ; France, vol. RAN WG2, No. Orlando, USA; Jul. 2, 2007, XP050135608.

NTT Docomo et al: "Cell ID Assignment for Home Node B" 3GPP Draft; R2-073374 , 3rd Generation Partnership Project (3GPP), Mobile Competence Centre ; 650, Route Des Lucioles ; F-06921 Sophia-Antipolis Cedex ; France, Athens, Grece, vol. R2-073374, No. 59, Aug. 20, 2007, pp. 1-5, XP002541822 the whole document.

Panasonic, "CSG Cell Prioritization by UE", 3GPP TSG RAN WG2 #59 R2-073282, Aug. 20, 2007.

Taiwan Search Report—TW097144274—TIPO—Aug. 28, 2012.

Taiwan Search Report—TW097144275—TIPO—Jul. 13, 2012.

T-Mobile, Report on email discussion "Home Cells (1)—General concepts & solutions for LTE", 3GPP TSG RAN2#60 R2-074904, Nov. 5, 2007.

Asustek, "Mobility Information and Cell (re)selection," Discussion & Decision, 3GPP TSG-RAN WG2 #60 Nov. 5-9, 2007, Jeju, Korea, R2-075135, pp. 1-8.

Huawei, "Detection of conflicting cell identities", 3GPP TSG-RAN-WG2 Meeting #59bis, R2-074216, Oct. 2007, p. 1-p. 3, URL:http://www.3gpp.org/ftp/tsg_ran/WG2_RL2/TSGR2_59bis/Docs/R2-074216.zip.

TSG RAN WG2, "LS on Closed Subscriber Groups for LTE Home cells", 3GPP TSG-RAN WG2#58bis R2-072991, Release 8, Jun. 25, 2007.

Ericsson: "Idle state access restriction for home eNB", R2-073415, 3GPP TSG-RAN WG2#59, Aug. 24, 2007.

"Evolved Universal Terrestrial Radio Access (E-UTRA) and Evolved Universal Terrestrial Radio Access (E-UTRAN); Overall description; Stage 2 (3GPP TS 36.300 version 8.4.0 Release 8); ETSI TS 136 300", ETSI Standards, LIS, Sophia Antipolis Cedex, France, vol. 3-R2, No. V8.4.0, Apr. 1, 2008, XP014041816, ISSN: 0000-0001 chapters: 10.1.1.2; 10.1.3; 10.1.3.2.

* cited by examiner

FAVORING ACCESS POINTS IN WIRELESS COMMUNICATIONS

CROSS-REFERENCE TO RELATED APPLICATIONS

This application claims the benefit of U.S. Provisional Patent application Ser. No. 60/988,631 entitled "APPARATUS AND METHOD TO FACILITATE IDLE STATE HANDOFF IN SYSTEMS WITH RESTRICTED ASSOCIATION" which was filed Nov. 16, 2007, U.S. Provisional Patent application Ser. No. 60/988,641 entitled "APPARATUS AND METHOD TO FACILITATE CONNECTED STATE HANDOFF IN SYSTEMS WITH RESTRICTED ASSOCIATION" which was filed Nov. 16, 2007, U.S. Provisional Patent application Ser. No. 60/988,649 entitled "APPARATUS AND METHOD TO FACILITATE MANAGEMENT AND ADVERTISEMENT OF NEIGHBOR LISTS IN SYSTEMS WITH RESTRICTED ASSOCIATION" which was filed Nov. 16, 2007, U.S. Provisional Patent application Ser. No. 61/086,223 entitled "IDLE MODE PARAMETERS FOR HeNB DETECTION AND CAMPING" which was filed Aug. 5, 2008, and U.S. Provisional Patent application Ser. No. 61/086,337 entitled "IDLE MODE PARAMETERS FOR HeNB DETECTION AND CAMPING" which was filed Aug. 5, 2008. The entireties of the aforementioned applications are herein incorporated by reference.

In addition, this application is related co-pending U.S. patent applications "UTILIZING RESTRICTION CODES IN WIRELESS ACCESS POINT CONNECTION ATTEMPTS" by Gavin Horn, et al. having U.S. Ser. No. 12/269,611, "UTILIZING BROADCAST SIGNALS TO CONVEY RESTRICTED ASSOCIATION INFORMATION" by Gavin Horn, et al. having U.S. Ser. No. 12/269,637, "CLASSIFYING ACCESS POINTS USING PILOT IDENTIFIERS" by Gavin Horn, et al. having U.S. Ser. No. 12/269,642, and "SECTOR IDENTIFICATION USING SECTOR PARAMETERS SIGNATURES" by Gavin Horn, et al. having U.S. Ser. No. 12/269,654, all of which are filed concurrently herewith, assigned to the assignee hereof, and expressly incorporated by reference herein.

BACKGROUND

I. Field

The following description relates generally to wireless communications, and more particularly to favoring access points in a wireless communication network.

II. Background

Wireless communication systems are widely deployed to provide various types of communication content such as, for example, voice, data, and so on. Typical wireless communication systems may be multiple-access systems capable of supporting communication with multiple users by sharing available system resources (e.g. bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth. In addition, mobile devices can communicate with other mobile devices (and/or base stations with other base stations) in peer-to-peer wireless network configurations.

MIMO systems commonly employ multiple ($N_T$) transmit antennas and multiple ($N_R$) receive antennas for data transmission. The antennas can relate to both base stations and mobile devices, in one example, allowing bi-directional communication between the devices on the wireless network. As mobile devices move throughout service areas, cells utilized for communication by the devices can be reselected between one or more access points (e.g., macrocells, femtocells, etc.). This can occur, for example, where an available access point, or serving sector thereof, can offer a better signal or service than a current access point. The mobile devices can measure parameters related to one or more cells or sectors, such as signal quality, service level, etc. and rank the cells or sectors according to desirability, which can be based on one or more of the parameters. In one example, the available access point can relate to a home access point for a given mobile device offering desirable billing, coverage, service options, etc.

SUMMARY

The following presents a simplified summary of one or more embodiments in-order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with facilitating favoring access points for reselection in wireless communications. For example, certain access points can be preferred by mobile devices as they provide desirable billing, data throughput, access levels, functionalities, and/or the like. The mobile devices can prefer the access points during reselection at least in part by applying an offset to measurement of communication with the preferred access points, which renders the preferred access points more desirable than other access points measured without utilizing the offset. In addition, when connected to a preferred access point, the mobile devices can add a hysteresis to measurement of communication with the current preferred access point rendering the current access point more desirable with respect to surrounding access points than without using the hysteresis value. In this regard, the devices can be reined in to a preferred access point when in an extended range and can stay connected with the preferred access point for an expanded range than compared to non-preferred access points.

According to related aspects, a method for cell reselection in a wireless communication network is provided. The method can include receiving wireless communication service from a first access point and determining a type and signal strength of a second access point. The method can further include applying an offset to the signal strength of the second access point in ranking the second access point for cell reselection from the first access point, the offset is selected based at least in part on the type of the second access point.

Another aspect relates to a wireless communications apparatus. The wireless communications apparatus can include at least one processor configured to receive wireless communication service from a first access point and receive a type and signal strength for each of the first access point and a second access point. The processor is further configured to apply an offset to the signal strength of the second access point in ranking the second access point for cell reselection from the first access point, the offset is applied based at least in part on the type of the second access point. Moreover, the processor is further configured to apply a hysteresis to the signal strength of the first access point in ranking the second access point for reselection from the first access point, the hysteresis is selected based at least in part on a type of the first access point. The wireless communications apparatus also comprises a memory coupled to the at least one processor.

Yet another aspect relates to a wireless communications apparatus that facilitates performing cell reselection to one or more access points. The wireless communications apparatus can comprise means for receiving service from a first access point and means for determining a type and signal strength of a second access point. The wireless communications apparatus can additionally include means for applying an offset to the signal strength of the second access point in ranking the second access point for reselection from the first access point, the offset is selected based at least in part on the type of the second access point.

Still another aspect relates to a computer program product, which can have a computer-readable medium including code for causing at least one computer to receive wireless communication service from a first access point. The computer-readable medium can also comprise code for causing the at least one computer to determine a type and signal strength of a second access point. Moreover, the computer-readable medium can comprise code for causing the at least one computer to apply an offset to the signal strength of the second access point in ranking the second access point for cell reselection from the first access point, the offset is selected based at least in part on the type of the second access point.

Moreover, an additional aspect relates to an apparatus. The apparatus can include a sector parameters measurer that measures a signal strength of one or more surrounding access points and an access point offset specifier that applies an offset to the signal strength of the one or more surrounding access points based at least in part on a type thereof. The apparatus can further include a cell reselector that establishes communication with the one or more surrounding access points based at least in part on a ranking of the offset applied signal strength with respect to a current access point.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
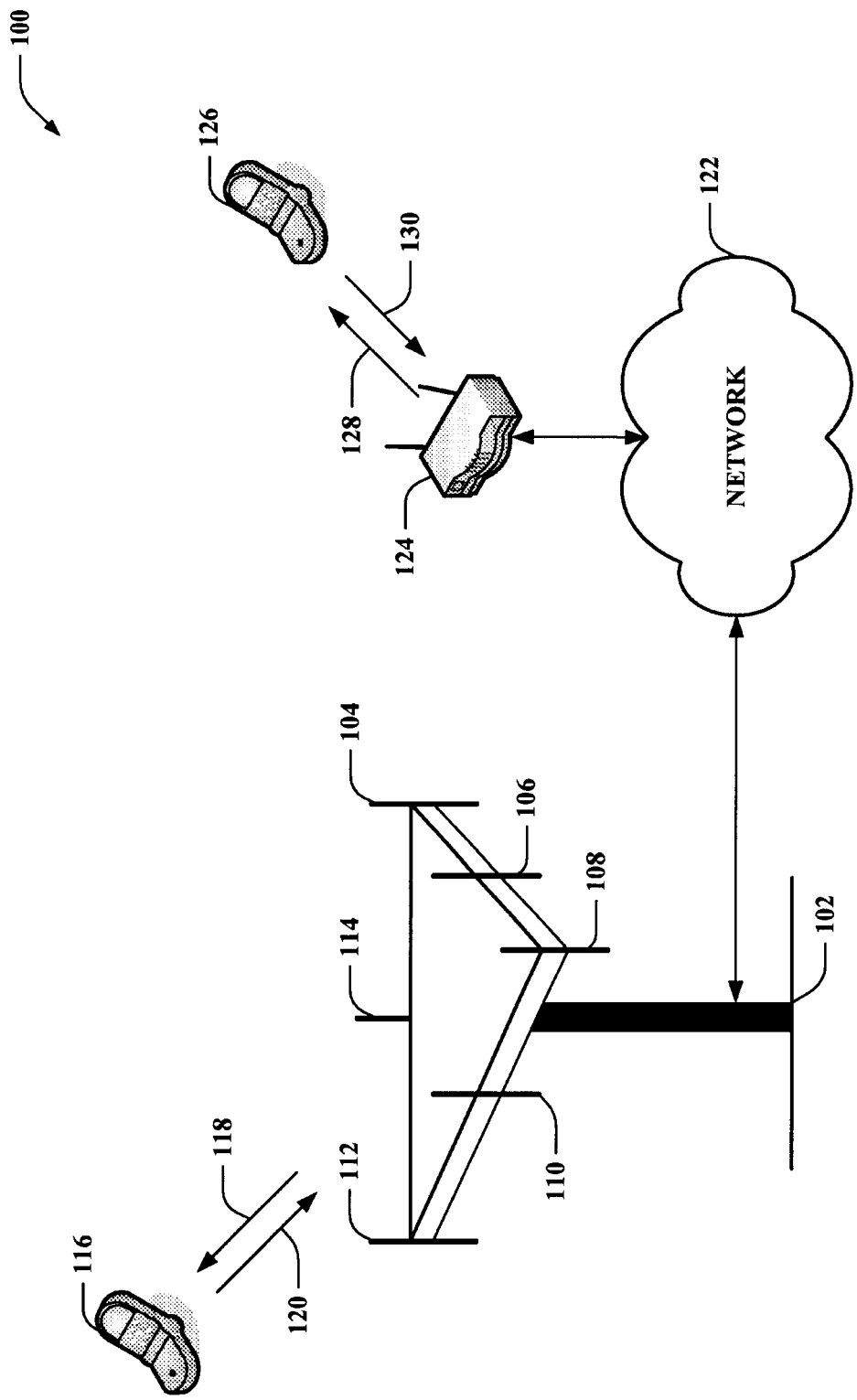
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in-order to provide a thorough understanding of one or more embodiments. It may be evident, however, that such embodiment(s) can be practiced without these specific details. In other instances, well-known structures and devices are shown in block diagram form in-order to facilitate describing one or more embodiments.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a mobile device. A mobile device can also be called a system, subscriber unit, subscriber station, mobile station, mobile, remote station, remote terminal, access terminal, user terminal, terminal, wireless communication device, user agent, user device, or user equipment (UE). A mobile device can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with mobile device (s) and can also be referred to as an access point, Node B, evolved Node B (eNode B or eNB), base transceiver station (BTS) or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

The techniques described herein may be used for various wireless communication systems such as code division multiple access (CDMA), time division multiple access (TDMA), frequency division multiple access (FDMA), orthogonal frequency division multiple access (OFDMA), single carrier frequency domain multiplexing (SC-FDMA) and other systems. The terms "system" and "network" are often used interchangeably. A CDMA system may implement a radio technology such as Universal Terrestrial Radio Access (UTRA), CDMA2000, etc. UTRA includes Wideband-CDMA (W-CDMA) and other variants of CDMA. CDMA2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is an upcoming release that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). CDMA2000 and UMB are described in documents from an organization named "3rd Generation Partnership Project 2" (3GPP2).

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more mobile devices such as mobile device 116 and mobile device 126; however, it is to be appreciated that base station 102 can communicate with substantially any number of mobile devices similar to mobile devices 116 and 126. Mobile devices 116 and 126 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112 and 114 transmit information to mobile device 116 over a forward link 118 and receive information from mobile device 116 over a reverse link 120. In a frequency division duplex (FDD) system, forward link 118 can utilize a different frequency band than that used by reverse link 120, for example. Further, in a time division duplex (TDD) system, forward link 118 and reverse link 120 can utilize a common frequency.

Each group of antennas and/or the area in which they are designated to communicate can be referred to as a sector or cell of base station 102. For example, antenna groups can be designed to communicate to mobile devices in a sector of the areas covered by base station 102. In communication over forward link 118, the transmitting antennas of base station 102 can utilize beamforming to improve signal-to-noise ratio of forward link 118 for mobile device 116. Also, while base station 102 utilizes beamforming to transmit to mobile device 116 scattered randomly through an associated coverage, mobile devices in neighboring cells can be subject to less interference as compared to a base station transmitting through a single antenna to all its mobile devices. Moreover, mobile devices 116 and 126 can communicate directly with one another using a peer-to-peer or ad hoc technology.

In addition, the base station 102 can communicate with a network 122, which can be one or more networks including a wireless service access network (e.g., a 3 G network), over a backhaul link connection. The network 122 can store information regarding access parameters related to the mobile device 116 and 126 and other parameters of a wireless access network to provide service to the devices 116 an 126. Furthermore, a femtocell 124 can be provided to facilitate communicating with the mobile device 126 over forward link 128 and reverse link 130 (similarly to forward link 118 and reverse link 120, as described supra). The femtocell 124 can provide access to one or more mobile devices 126 much like the base station 102, but on a smaller scale. In one example, femtocell 124 can be configured in a residence, business, and/or other close range setting (e.g., theme park, stadium, apartment complex, etc.). The femtocell 124 can connect to the network 122 utilizing a backhaul link connection, which can be over a broadband Internet connection (T1/T3, digital subscriber line (DSL), cable, etc.), in one example. The network 122 can similarly provide access information for the mobile device 126.

According to an example, mobile devices 116 and 126 can travel over service areas performing cell reselection among disparate base stations and/or femtocells during travel. In this regard, the mobile devices 116 and 126 can effectuate continuous wireless service seamless to users of the mobile devices 116 and 126. In one example (not shown), mobile device 126 can have been communicating with the base station 102 similarly to the mobile device 116, and can have moved into a specified range of the femtocell 124. In this regard, the mobile device 126 can have reselected one or more cells related to the femtocell 124 to receive more desirable wireless service access. In one example, the femtocell 124 can be a home access point for the mobile device 126 offering more desirable billing and/or other access options. In another example, the femtocell 124 can be related to a business or venue offering options or data tailored to the respective business or venue. Thus, mobile device 126 can reselect one or more cells related to the femtocell 124, in an idle and/or connected mode, to receive such tailored options. In addition, as mobile device 126 moves toward base station 102, it can reselect a cell related thereto, for a variety of reasons (e.g., to mitigate interference on the femtocell 124, to receive a more optimal signal or increased throughput, etc.).

In traveling over the service area, mobile devices 116 and/or 126 can continually measure available base stations (such as base station 102), femtocells (such as femtocell 124), and/or other access points, to determine when cell reselection is beneficial to the mobile devices 116 and/or 126. The measuring can include, for example, evaluating signal quality, throughput, services available, a wireless access provider related to the access point, and/or the like. Based on one or more of the measurements, the mobile devices 116 and/or 126 can rank access points for reselection. Upon determining the ranking, the mobile devices 116 and/or 126 can attempt cell reselection with the highest ranking access point. In addition, the mobile devices 116 and/or 126 can maintain a list of accessible access points and/or groups of accessible access points. The accessible access points can relate to, for example, restricted association access points that the mobile devices 116 and/or 126 are authorized to access and/or to which access is preferred or otherwise favorable over other access points.

In one example, the femtocell 124 can be such a restricted association access point. Restricted association access points, for example, can be restricted in some aspects where each access point provides certain services to certain mobile devices (e.g., mobile devices 116 and/or 126) but not necessarily to other mobile devices or access terminals (not shown). For example, the femtocell 124 can be restricted to not provide to the other mobile devices or access terminals registration, signaling, voice call, data access, and/or additional services. Restricted association access points can be deployed in an ad-hoc manner. For example, a given homeowner can install and configure a restricted access point for the home.

In one example, the mobile devices 116 and/or 126 can identify one or more available access points based at least in part on one or more indicators in a broadcast signal related to the access point(s). Upon receiving the one or more indicators, the mobile devices 116 and/or 126 can ensure the access point(s) is/are in the list, or that a related group identifier is in the list, before attempting cell reselection. In another example, the mobile devices 116 and/or 126 can verify association of the access point with the list before measuring the parameters for ranking.

In measuring the access points, such as base station 102 and/or femtocell 124, the mobile devices 116 and/or 126 can prefer one or more of the access points. As described, the femtocell 124 can be a home access point for the mobile device 126, and thus the mobile device 126 can prefer the femtocell 124 to other access points. For example, mobile device 126, in measuring surrounding access points in cell reselection can apply a hysteresis value to measurement of the femtocell 124 to allow the femtocell 124 to be more highly ranked than would be an access point without application of the hysteresis value. This effectively extends the coverage area of the femtocell 124 for the mobile device 126. In addition, though not shown, where mobile device 126 is communicating with a disparate access point, such as base station 102, as mobile device 126 moves in range of the femtocell 124, an offset can be applied to measurements of the femtocell 124 when comparing to measurements of the base station 102 to prefer the femtocell 124 over the base station 102. This effectively expands coverage of the femtocell 124 with respect to the mobile device 126 o rein in the mobile device 126.

In this regard, the mobile device 126 can establish communication with the femtocell 124 when in proximity using the offset, and once connected can stay communicating with the femtocell 124 for a longer distance than normal using the hysteresis value to extend time and area for receiving the desirable services from the femtocell 124, for example. In addition, the mobile device 126 can perform reselection to the femtocell 124 in an active communication mode to continue service therewith. Moreover, the mobile device 126 can perform reselection in an idle mode to camp on the femtocell 124. Camping can refer to operating in an idle mode in the sector where the mobile device sleeps and periodically wakes up to receive events such as pages, loss of signal, measurement of neighboring sectors, etc., that can result in switching from the idle mode to an active mode.

Figure 2:
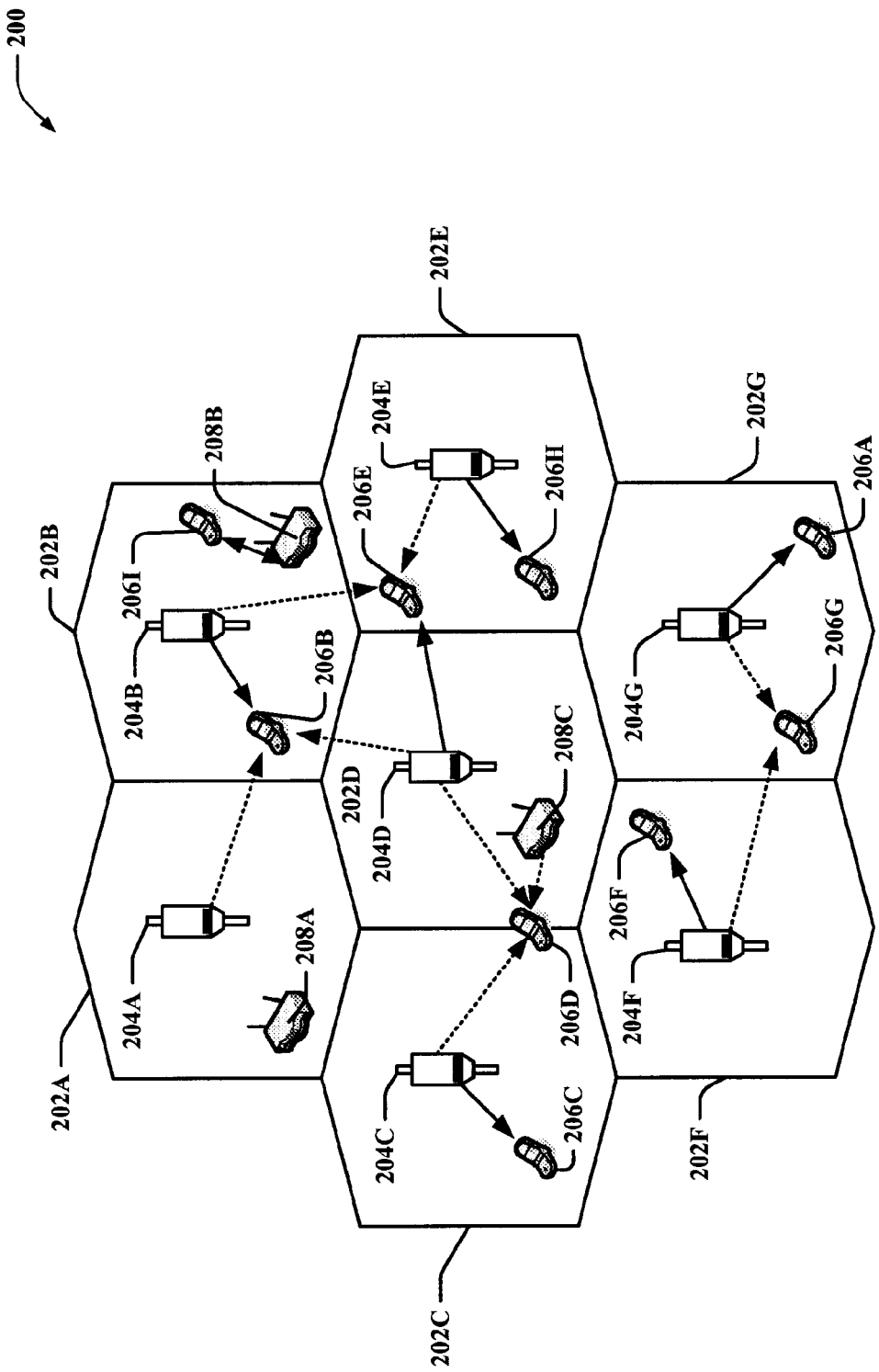
FIG. 2 is an illustration of a wireless communication network that facilitates cell reselection.

Now referring to FIG. 2, a wireless communication system 200 configured to support a number of mobile devices is illustrated. The system 200 provides communication for multiple cells, such as for example, macrocells 202A-202G, with each cell being serviced by a corresponding access point 204A-204G. As described previously, for instance, the access points 204A-204G related to the macrocells 202A-202G can be base stations. Mobile devices 206A-206I are shown dispersed at various locations throughout the wireless communication system 200. Each mobile device 206A-206I can communicate with one or more access points 204A-204G on a forward link and/or a reverse link, as described. In addition, access points 208A-208C are shown. These can be smaller scale access points, such as femtocells, offering services related to a particular service location, as described. The mobile devices 206A-206I can additionally communicate with these smaller scale access points 208A-208C to receive offered services. The wireless communication system 200 can provide service over a large geographic region, in one example (e.g., macrocells 202A-202G can cover a few blocks in a neighborhood, and the femtocell access points 208A-208C can be present in areas such as residences, office buildings, and/or the like as described). In an example, the mobile devices 206A-206I can establish connection with the access points 204A-204G and/or 208A-208C over the air and/or over a backhaul connection.

Additionally, as shown, the mobile devices 206A-206I can travel throughout the system 200 and can reselect cells related to the various access points 204A-204G and/or 208A-208C as it moves through the different macrocells 202A-202G or femtocell coverage areas. In one example, the one or more of the mobile devices 206A-206I can be associated with a home femtocell related to at least one of femtocell access points 208A-208C. For example, mobile device 206I can be associated with femtocell access point 208B as its home femtocell. Thus, though mobile device 206I is in macrocell 202B, and thus in coverage area of access point 204B, it can communicate with the femtocell access point 208B instead of (or in addition to) access point 204B. In one example, the femtocell access point 208B can provide additional services to the mobile device 206I, such as desirable billing or charges, minute usage, enhanced services (e.g., faster broadband access, media services, etc.). Thus, when the mobile device 206I is in range of the femtocell access point 208B, it can be reined in to communicate therewith by favoring the femtocell access point 208B in reselection.

For example, mobile device 206D can be associated with femtocell access point 208C. As the mobile device 206D moves from macrocell 202C into 202D and closer to access points 204D and/or 208C, it can begin the cell reselection process, as described herein. This can include, for example, measuring surrounding cell parameters (e.g., related to access points 204C, 204D, and 208C) to determine a desirable connection. The parameters can relate to, for example, signal quality, connection throughput, services offered, a service provider related to the access point, and/or the like. The mobile device 206D can additionally verify an identifier of the access point as present in a list of accessible access points, as described. The list can additionally or alternatively identify groups of access points where a group identifier of the access point can be verified with group identifiers in the list. In the foregoing example, the mobile device 206D can measure parameters for access points 204C, 204D, and 208C and rank the cells to determine whether to perform cell reselection from access point 204C to one of the others if their rank is higher. As in the previous example, where femtocell access point 208C relates to a home femtocell of the mobile device 206D, it can favor it for reselection. For example, the mobile device 206D can add an offset to measured parameters of the femtocell access point 208C as it moves within range to prefer the femtocell access point 208C to the access point 204C. In addition, once communicating with the femtocell access point 208C, the mobile device 206D can apply a hysteresis in measuring communications parameters of other access points for reselection to prefer the femtocell access point 208C in that regard as well. If one or more of the disparate access points 204D and/or 208C rank higher than the access point 204C, mobile device 206D can reselect one or more cells related to the disparate access point 204D or 208C whether in an idle or connected mode.

In one example, one or more of the disparate access points 204D and/or 208C can implement restricted association where some mobile devices cannot connect thereto, and/or the access points 204D and/or 208C can restrict certain mobile devices with respect to providing signaling, data access, registration, service, and/or the like. This can be based at least in part on a service provider of the mobile device and the restricted associated access point, for example. In another example, the restricted association access point can relate to certain mobile devices, such as a corporate access point restricting access only to corporate issued mobile devices. Thus, if the mobile device 206D cannot reselect cells related to one or more of the disparate access points 204D and/or 208C due to restricted association, it can attempt cell reselection with one or more of the other ranked access points until it finds an access point to which it can connect. Where the mobile device 206D cannot connect to access point 204D and/or 208C due to restricted association, it can receive a restriction code indicating the reason for the restriction.

Furthermore, as described, the mobile devices 206A-206I can maintain a list of accessible access points and/or groups thereof. In one example, the list can include only certain types of access points (such as femtocells) since other types of access points (such as macrocells) can be accessible from substantially any mobile device. The list of accessible access points and/or groups can be originally populated, for example, by one or more access points in communication with the mobile device 206A-206I, which can retrieve the information from an underlying wireless network as described. As the mobile devices 206A-206I move throughout the coverage area of the wireless system 200 and reselects cells as described, it can first verify the cells as being present in the list where relevant. In one example, if the mobile devices 206A-206I determine one or more femtocell access points 208A-208C to be the highest ranked cell based on measurements as described, it can verify that the respective femtocell access point is in the list. If not, the mobile devices 206A-206I can decide not to attempt access to the femtocell access point and can attempt connection with the next highest ranked access point and/or attempt to locate another access point on a disparate frequency. As described, the ranking can be affected by an offset and/or hysteresis value to favor an access point respectively when in range or connected thereto.

Figure 3:
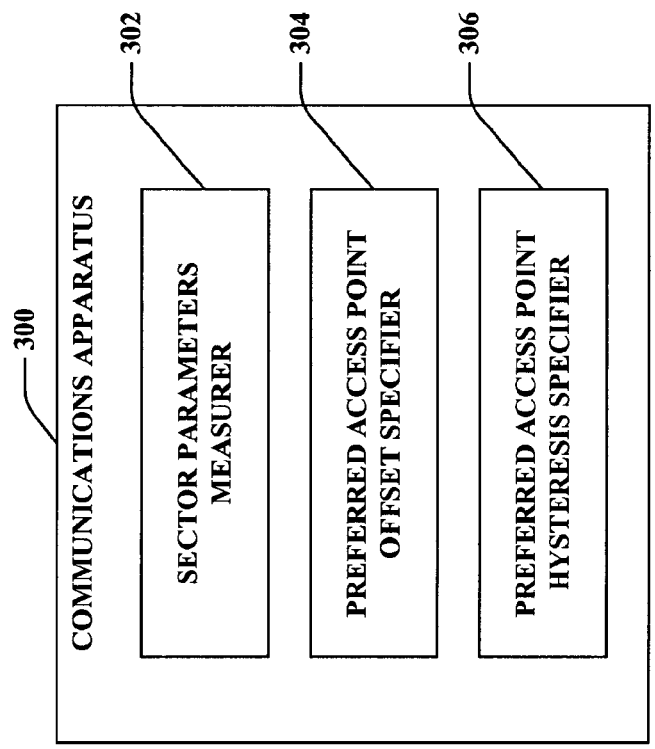
FIG. 3 is an illustration of an example communications apparatus for employment within a wireless communications environment.

Turning to FIG. 3, illustrated is a communications apparatus 300 for employment within a wireless communications environment. The communications apparatus 300 can be a base station or a portion thereof, a mobile device or a portion thereof, or substantially any communications apparatus that receives data transmitted in a wireless communications environment. The communications apparatus 300 can include a sector parameters measurer 302 that measures communication parameters related to a sector, such as signal strength, data throughput, services offered, etc. to determine whether to reselect the sector or related access point. The communications apparatus 300 can additionally include a preferred access point offset specifier 304 that can apply an offset to one or more communication parameters measurements to prefer an access point when measuring sector communication parameters, as well as a preferred access point hysteresis specifier 306 that can add a hysteresis value to communications parameters related to a preferred access point to additionally prefer the access point in cell reselection. In one example, the preferred access points can relate to one or more access points in a maintained list of favorable access points and/or groups (such as a closed subscriber group list (CSG), etc.).

According to an example, the sector parameters measurer 302 can measure one or more parameters related to communication with a sector to evaluate the sector for cell reselection thereto. As described above, sectors can be ranked for reselection according to the parameters. The preferred access point offset specifier 304 can positively affect parameters related to surrounding preferred access point by adding an offset value to the parameters. This can, in some cases, positively affect the ranking of the preferred access point for reselection. In addition, the preferred access point offset specifier 304, in one example, can apply negative offsets to non-preferred surrounding access point to, in some cases, effectively lower the ranking thereof in cell reselection. Additionally or alternatively, the preferred access point hysteresis specifier 306 can add a hysteresis value to the parameters of a current access point, which can positively affect the ranking thereof to mitigate frequent reselection related to the current access point. The preferred access point hysteresis specifier 306 can additionally select a hysteresis value related to whether the current access point is preferred (or otherwise favorable) or not. By selecting a higher hysteresis value for currently connected preferred access point, coverage of the preferred access point is effectively expanded for the communications apparatus 300.

In one example, cell reselection can occur when $R_n > R_s$, where $R_n$ is a ranking of a new cell and $R_s$ is a ranking of the current cell. Thus, in an example, reselection can occur when $$Q_{meas,n} - Q_{offset,CSG} > Q_{meas,eNB} + Q_{hyst}(eNB)$$

or, $$Q_{meas,n} > Q_{meas,eNB} + Q_{hyst}(eNB) + Q_{offset,CSG}$$

where $Q_{meas,n}$ is a measurement (such as signal strength and/or one or more additional parameters as described) of a surrounding access point, $Q_{offset,CSG}$ is the offset related to the surrounding access point, where the surrounding access point is preferred and/or in a related group of preferred access points, $Q_{meas,eNB}$ is a measurement of an access point to which the communications apparatus 300 is currently connected, which can be the same measurement parameter utilized with the current access point, and $Q_{hyst}$(eNB) is the hysteresis value related to the current access point. It is to be appreciated that cell reselection ranking can consider this hysteresis value related to a current non-preferred access point to prevent frequent reselection in a short period of time (e.g. ping-ponging effect) between access points. As described, the sector parameters measurer 302 can measure $Q_{meas,n}$ and $Q_{meas,eNB}$ while the preferred access point offset specifier 304 can determine and/or apply $Q_{offset,CSG}$. Thus, where the above formulas are satisfied, cell reselection can be performed from the current to the preferred access point. Using the $Q_{offset,CSG}$ value, which can be negative, the communications apparatus can prefer the access point since the negative value is subtracted from the measured parameter, which positively affects measurement of the preferred access point. In another example, a positive offset can be subtracted from the measured value where the surrounding access point is not a preferred access point.

Similarly, where the current cell is a preferred access point, reselection can occur to a surrounding non-preferred access point when the following formula is satisfied.

$$Q_{meas,n} - Q_{offset,n}(eNB) > Q_{meas,HeNB} + Q_{hyst}(HeNB)$$

or, $$Q_{meas,n} > Q_{meas,HeNB} + Q_{hyst}(HeNB) + Q_{offset,n}$$

where $Q_{meas,n}$ is a measurement (such as signal strength and/or one or more additional parameters as described) of the surrounding non-preferred access point, $Q_{offset,n}$(eNB) is the offset related to the non-preferred access point, $Q_{meas,HeNB}$ is a measurement of the current preferred access point to which the communications apparatus 300 is currently connected, which can be the same measurement parameter utilized with the non-preferred access point, and $Q_{hyst}$(HeNB) is the hysteresis value related to the current access point. In one example, as described, the sector parameters measurer 302 can measure the $Q_{meas,n}$ and $Q_{meas,HeNB}$. Moreover, the preferred access point hysteresis specifier 306 can select and provide the hysteresis value $Q_{hyst}$(HeNB) based on the currently connected access point being a preferred access point or not. Thus, the hysteresis value can vary based at least in part on a type of the current access point. In this regard, the communications apparatus 300 can stay camped on the preferred access point and/or communicating therewith for an extended period of time and/or for an expanded coverage area using the disparate hysteresis value.

Figure 4:
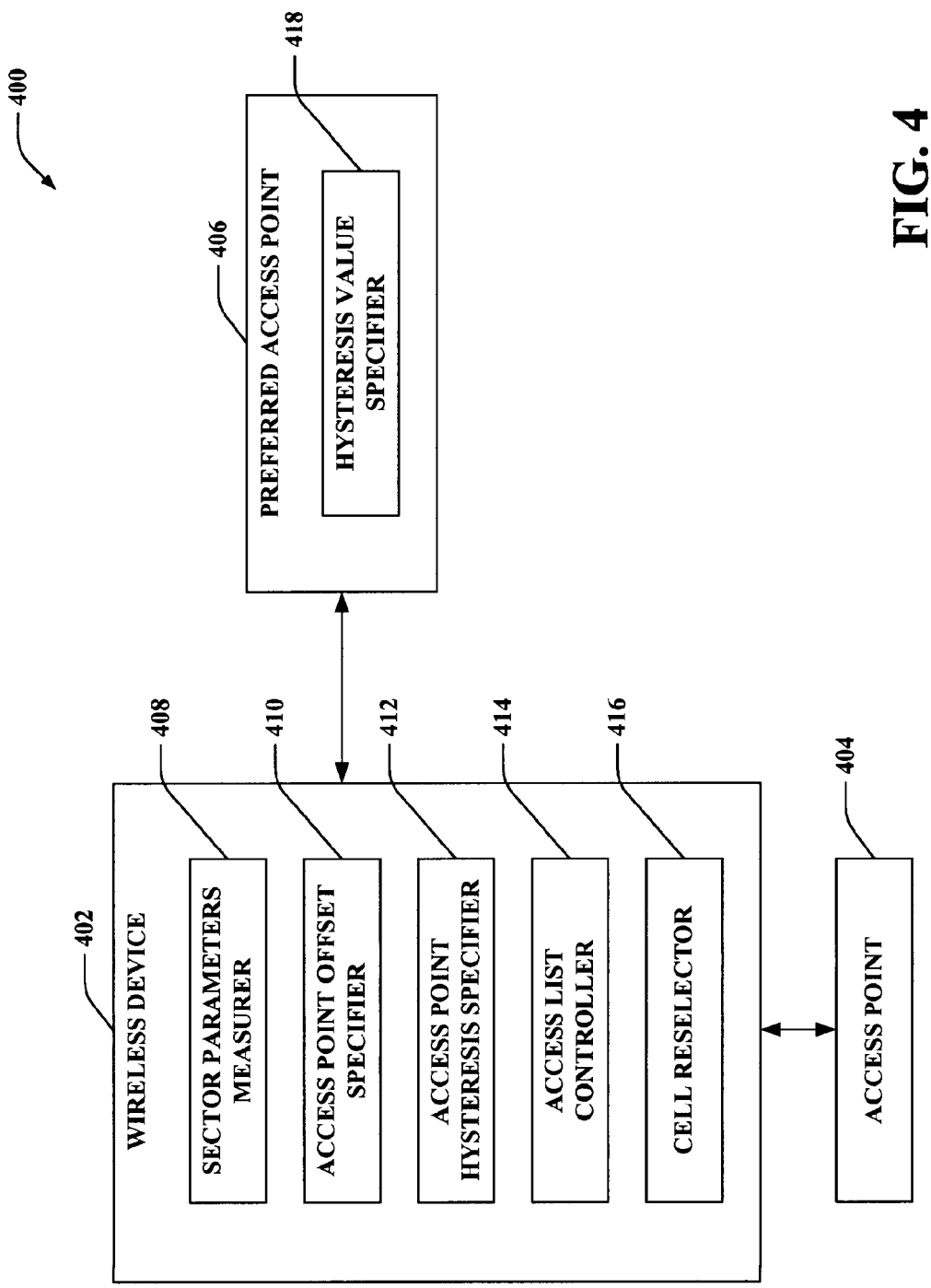
FIG. 4 is an illustration of an example wireless communications system that effectuates applying offsets and/or hysteresis values in cell reselection.

Now referring to FIG. 4, illustrated is a wireless communications system 400 that facilitates favoring access points in wireless communication networks. The wireless device 402, access point 404, and/or preferred access point 406 can be a base station, femtocell, mobile device, or portion thereof. In one example, wireless device 402 can transmit information to an access point 404 and/or 406 over a reverse link or uplink channel; further wireless device 402 can receive information from access point 404 and/or 406 over a forward link or downlink channel. Moreover, system 400 can be a MIMO system. Also, the components and functionalities shown and described below in the wireless device 402 can be present in the access points 404 and/or 406 as well and vice versa, in one example; the configuration depicted excludes these components for ease of explanation.

Wireless device 402 includes a sector parameters measurer 408 that can measure one or more communications parameters related to a sector as part of a cell reselection or initial communication process, an access point offset specifier 410 that can determine an offset that can be utilized to affect measurements related to currently connected non-preferred access points to increase desirability of preferred access points for reselection, an access point hysteresis specifier 412 that determines a hysteresis value that can be utilized when connected with a preferred access point to positively affect measurements of the preferred access point to increase its desirability when considering disparate access points for reselection, an access list controller that maintains a list of accessible access points and/or groups of access points, and a cell reselector 416 that can perform reselection based at least in part on the measurements and applied offsets. The maintained list can additionally comprise types of access points that can indicate whether the access points are femtocells, macrocells, restricted association (with respect to providing service, signaling, data access, registration, service, and/or the like, as described), non-restricted association, CSG, and/or the like, for example.

According to an example, the wireless device 402 can communicate with the access point 404, which can be a non-preferred access point, to receive wireless communication services. As the wireless device 402 moves over a coverage area, it can come in proximity of other access points, such as preferred access point 406. The sector parameters measurer 408 can determine communication parameters related to the access point 406, or sector thereof, such as signal strength, data throughput, services offered, billing rates, service provider, etc., as described, as well as other surrounding access points as well as the current access point 404 utilized for communication. In one example, the sector parameters measurer 408 can tune away from current access point 404 to evaluate parameters of access point 406, meaning it can tune from a frequency required to communicate with the current access point 404 to a frequency of the preferred access point 406 to briefly measure parameters related thereto. The access list controller 414 can be consulted to determine whether the preferred access point 406 is in a list of access points (or a list of related groups, for example). The list, as mentioned, can relate to accessible access points, restricted association access points, related groups, and/or the like.

If the preferred access point 406 is in the list, the access point offset specifier 410 can provide an offset that can be applied to measurements related to the preferred access point 406 to render such more desirable than without the offset. This can result in earlier connection with the preferred access point 406 to receive the desirable services, as described above. In addition, a negative offset can be applied, for example, where the preferred access point 406 is not in the list. It is to be appreciated that a hysteresis can be applied to the currently connected access point 404 measurements, as well, to prevent frequent reselection in a short period of time between the access points; thus if the measurements of either access point changes slightly, the hysteresis value applied can mitigate reselection until there is a greater disparity in the cell measurements. Where the preferred access point 406, with offset applied, ranks higher than the current access point 404 (e.g., with hysteresis applied), the cell reselector can perform reselection to a sector of the preferred access point 406.

In another example, the preferred access point 406 can comprise a hysteresis value specifier 418 that can determine multiple hysteresis values for the preferred access point 406. For example, one value can be for wireless devices to which the preferred access point 406 is, indeed, a preferred access point, and another value for those devices to which the preferred access point 406 is not a preferred access point. According to an example, the wireless device 402 can be connected to preferred access point 406 receiving wireless communication service therefrom. As wireless device 402 moves throughout a mobile service area, the sector parameters measurer 408, as described above, can measure communications parameters of various sectors to rank the sectors for cell reselection. As the wireless device 402 is communicating with its preferred access point 406, in one example, it need not utilize an offset from the access point offset specifier 410. Nevertheless, the access point hysteresis specifier 412 can determine a hysteresis related to the preferred access point 406 and apply the hysteresis in ranking the currently connected preferred access point 406 among other access points to determine whether reselection should occur.

As described, one or more hysteresis values can be specified by the hysteresis value specifier 418, which can be transmitted to the wireless device 402 upon connection with the preferred access point 406. In another example, the values can be received from other surrounding or previously connected access points, or otherwise. It is to be appreciated that the access point offset specifier 414 can similarly receive the offset from a current access point, a surrounding access point, and/or one or more previously connected access points. The access point hysteresis specifier 412 can select a received hysteresis value to utilize in ranking the preferred access point 406 among the other access points, including access point 404. In one example, the access list controller can determine whether the preferred access point 406 is within a list of preferred access points maintained by the access list controller 414. Thus, if the preferred access point 406 is in the list, a preferred access point hysteresis value can be selected by the access point hysteresis specifier 412 to positively affect current cell parameters, which can cause the wireless device 402 to stay connected to the preferred access point 406 for a larger coverage area. If, however, the preferred access point 406 is not in the list, the access point hysteresis specifier 412 can select a lower hysteresis value to positively affect current cell measurements to prevent ping-ponging effect between access points. If the access point 404 ranks higher than the preferred access point 406 with one or more hysteresis values applied to positively affect measurements of the preferred access point 406, the cell reselector 416 can reselect one or more cells related to the access point 404.

In either case, utilizing the offset in ranking a preferred access point for cell reselection thereto or utilizing a higher hysteresis in ranking a preferred access point for cell reselection to a disparate access point expands coverage of the preferred access point where desired by the wireless device 402. This allows the wireless device 402 to receive desirable services of preferred access points, as previously described, for the larger coverage area. It is to be appreciated that the cell reselector can reselect one or more cells related to a disparate access point (not shown) where the access point chosen for reselection is not available. For example, the disparate access point can be in a disparate frequency range than the currently connected access point and/or the access point that was originally reselected.

Figure 5:
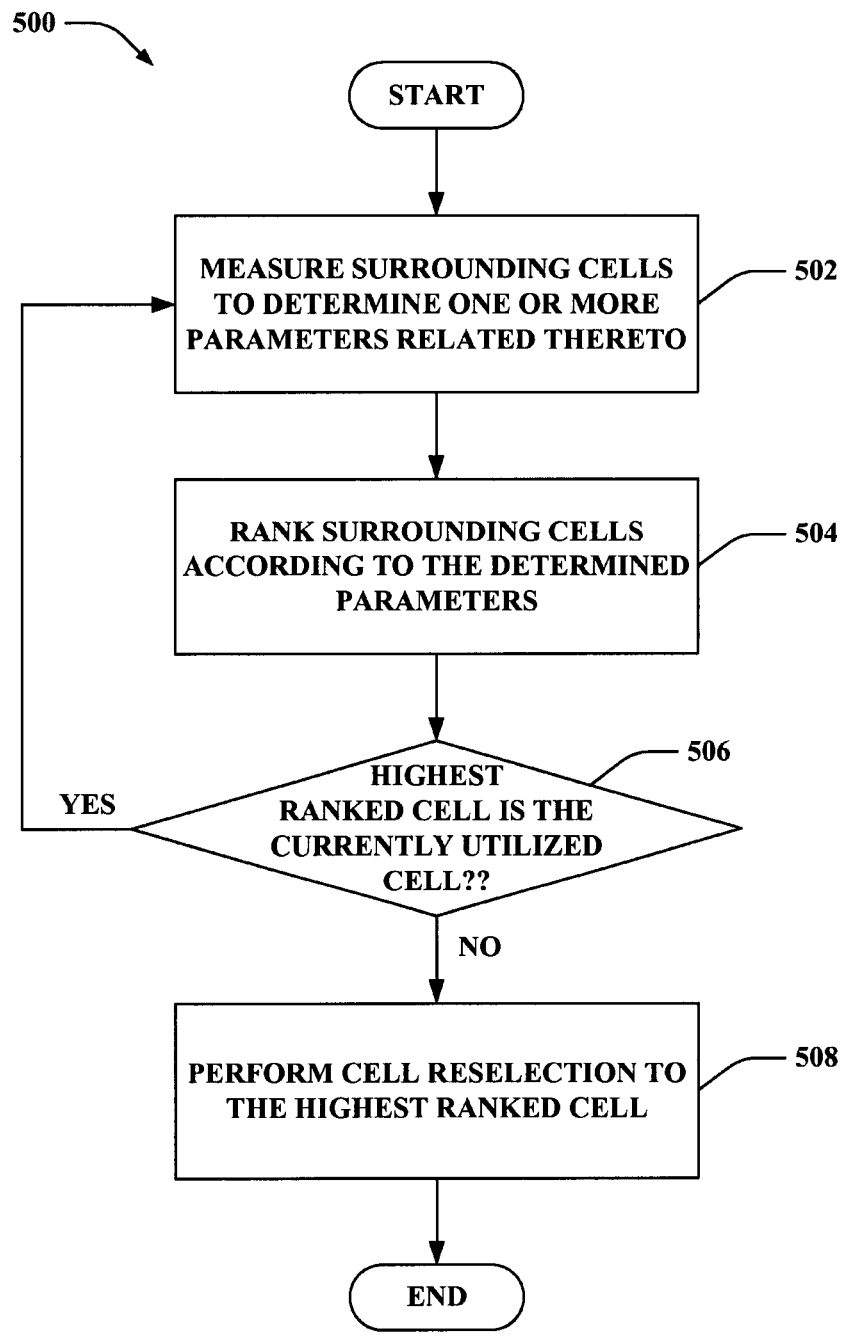
FIG. 5 is an illustration of an example methodology that facilitates performing cell reselection in wireless networks.
Figure 6:
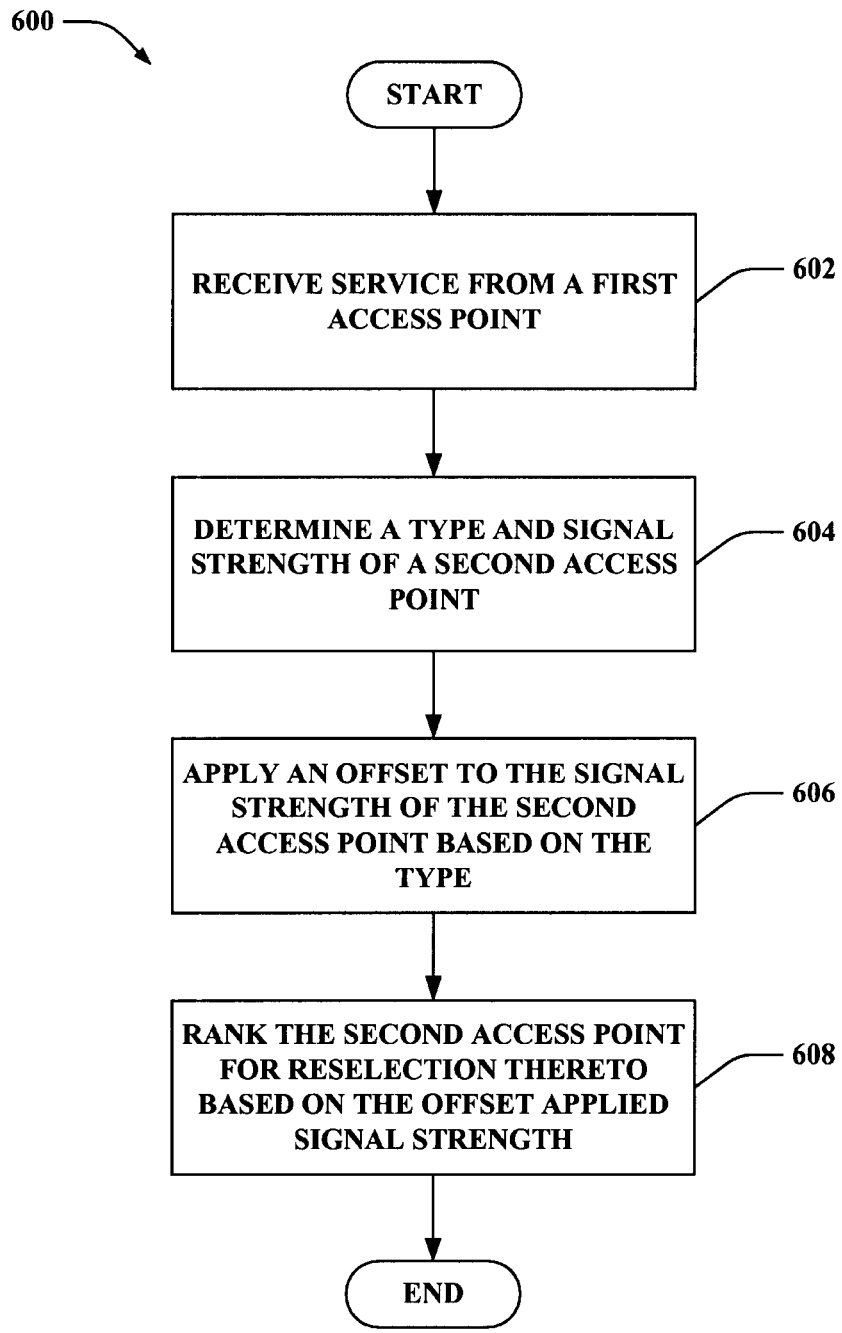
FIG. 6 is an illustration of an example methodology that facilitates applying an offset to a potential access point in ranking for reselection.
Figure 7:
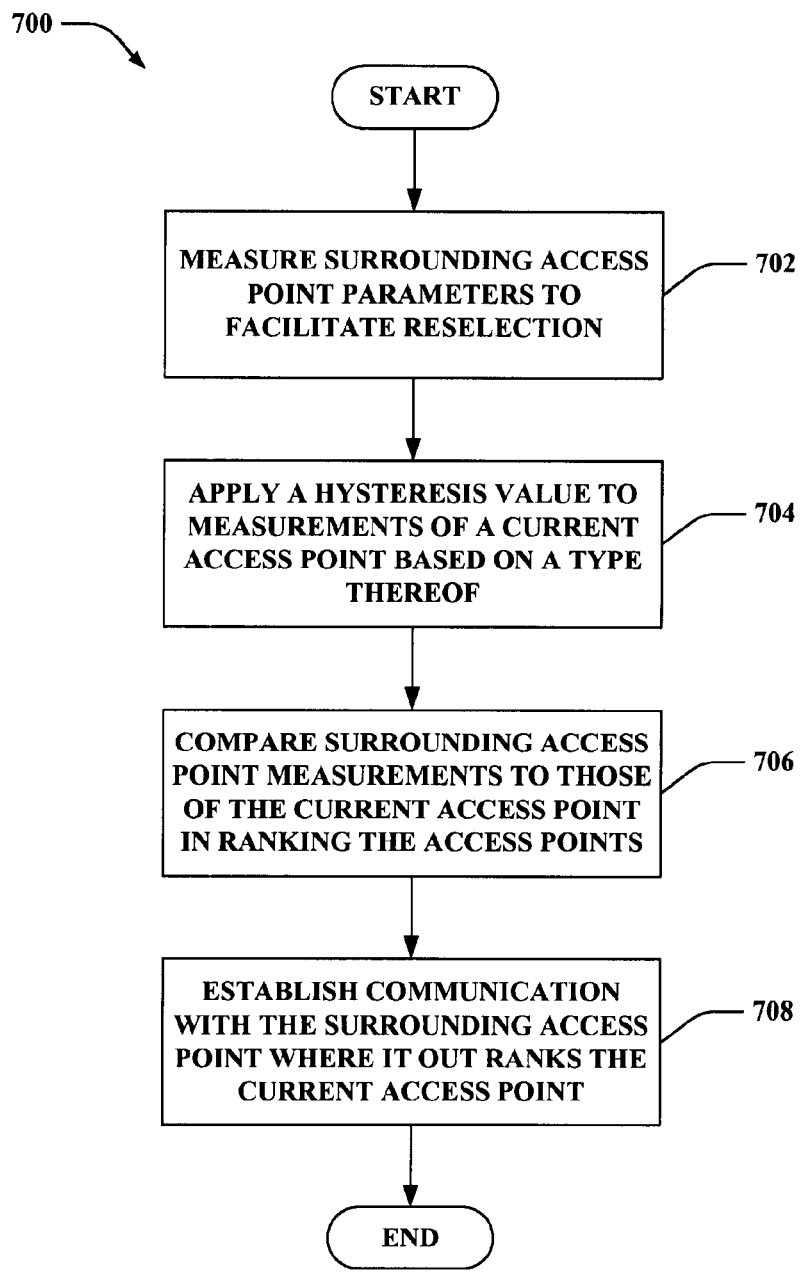
FIG. 7 is an illustration of an example methodology that facilitates selecting and applying a hysteresis value to a current access point for reselection.

Referring to FIGS. 5-7, methodologies relating to cell reselection and ranking access points for reselection using offsets and/or hysteresis values are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

Turning to FIG. 5, a methodology 500 that facilitates cell reselection in wireless communications is displayed. At 502, surrounding cells are measured to determine one or more parameters related thereto. As described, the parameters can relate to communication metrics, such as signal strength, throughput, etc. and/or one or more additional considerations, such as an access point identifier, a group identifier, sector identifier, services offered, a related access provider, etc. In addition, the parameters can relate to the cell being provided by a home access point, which provides enhanced billing aspects, additional service or speeds, and/or the like. The parameters can also relate to offsets or hysteresis to increase consideration of desirable access points (such as a home access point, for example) and/or decrease consideration of other access points. At 504, the surrounding cells can be ranked according to the determined parameters. The ranking can indicate an order of desirable cells from which to receive wireless communication services.

At 506, it can be determined whether the highest ranked cell is that currently utilized. Such a determination can be utilized to ensure connection with an optimal access point. If the highest ranked cell is the cell currently utilized to receive wireless communications, the method proceeds back to step 502 to again measure surrounding cells. This can be based on a timer, in one example, as to not flood the network with cell measurements or spend resources by constantly measuring the cells. If the highest ranked cell is not the currently utilized cell, at 508, cell reselection can be performed, as described herein, to reselect the highest ranked cell. It is to be appreciated, in one example, that once reselection is complete, the method, in one example, can proceed back to step 502 to continue measuring surrounding cells. As described, the access points can be base stations, femtocells, and/or the like.

Turning to FIG. 6, illustrated is a methodology 600 that facilitates ranking access points in cell reselection. At 602, service is received from a first access point. The service, for example, can relate to wireless network access provided by the access point to facilitate communication over the network. At 604, a type and signal strength of a second access point can be determined. This can occur, for example, as part of a cell reselection procedure where the surrounding access points can be measured for reselection thereto. In addition, the type can be determined based at least in part on presence of the access point in a maintained list of preferred and/or restricted access points, as described. At 606, an offset can be applied to the signal strength of the second access point based on the type. The offset can be applied during measurement and/or ranking for cell reselection, for example. The offset can be positive and/or negative based on the second access point type, as described. Thus, where the second access point is preferred, for example, the offset can be positive so as to prefer the access point to others that may have better signal qualities (e.g. since the preferred access point can have other aspects that are more desirable). At 608, the second access point can be ranked for reselection thereto based on the offset applied signal strength. Thus, though the access point can have decreased signal strength, as in the example above, reselection can occur to the access point over one with a stronger signal to take advantage of the other desirable aspects related to the access point.

Turning to FIG. 7, illustrated is a methodology 700 that facilitates applying selective hysteresis values in cell reselection. At 702, surrounding access point parameters can be measured to facilitate reselection. Thus, simultaneous communication can be occurring with a current access point, in one example. At 704, a hysteresis value can be applied to measurements of the current access point based on a type thereof. Thus, based on the type of the current access point, a hysteresis value can be selected for cell reselection. In one example, the type can be a preferred and/or restricted association access point from which access can be received; in this example, the hysteresis value selected can be greater than where the access point is not preferred. Thus, where the access point is preferred, the hysteresis value can positively impact measurement values related to the current access point, which can extend coverage for the access point. At 706, surrounding access point measurements can be compared to those of the current access point in ranking the access points. Thus, as described, the hysteresis value applied measurements of the current access points can be evaluated with respect to values of other access points, and at 708, where a surrounding access point still out ranks the current access point, communication can be established with the surrounding access point.

It will be appreciated that, in accordance with one or more aspects described herein, inferences can be made regarding many aspects of cell reselection, such as measuring the parameters, ranking the cells according to the parameters (and/or additional parameters), and even aspects of actual reselection (such as when to perform the reselection, etc.) as described. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. In one example, inferences can additionally be made in determining offset and/or hysteresis values to apply to prospective and/or current access points to extend coverage to desirable or preferred access points in cell reselection, as described.

Figure 8:
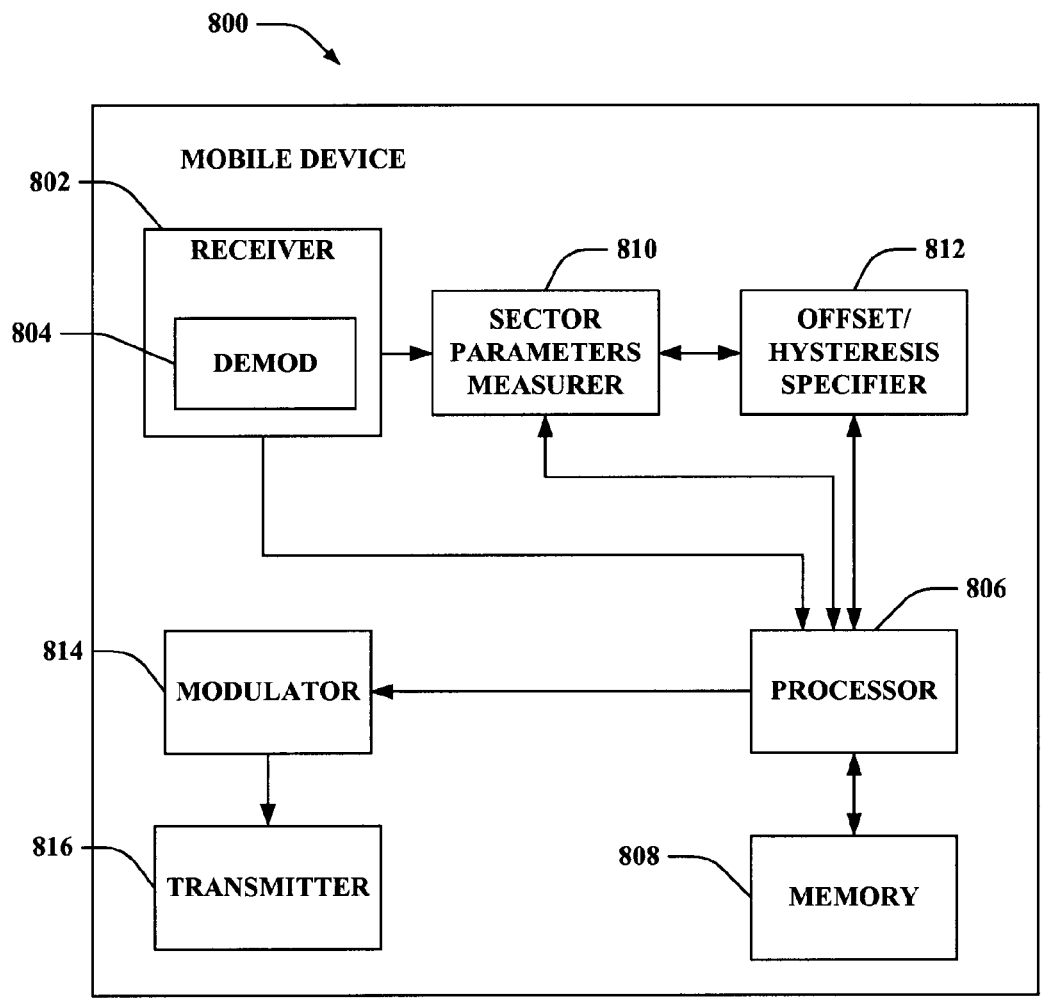
FIG. 8 is an illustration of an example mobile device that facilitates applying offsets and selectable hysteresis values for ranking in cell reselection.

FIG. 8 is an illustration of a mobile device 800 that facilitates applying hysteresis and/or offset values in cell reselection to prefer certain types of access points. Mobile device 800 comprises a receiver 802 that receives a signal from, for instance, a receive antenna (not shown), performs typical actions on (e.g., filters, amplifies, downconverts, etc.) the received signal, and digitizes the conditioned signal to obtain samples. Receiver 802 can comprise a demodulator 804 that can demodulate received symbols and provide them to a processor 806 for channel estimation. Processor 806 can be a processor dedicated to analyzing information received by receiver 802 and/or generating information for transmission by a transmitter 816, a processor that controls one or more components of mobile device 800, and/or a processor that both analyzes information received by receiver 802, generates information for transmission by transmitter 816, and controls one or more components of mobile device 800.

Mobile device 800 can additionally comprise memory 808 that is operatively coupled to processor 806 and that can store data to be transmitted, received data, information related to available channels, data associated with analyzed signal and/or interference strength, information related to an assigned channel, power, rate, or the like, and any other suitable information for estimating a channel and communicating via the channel. Memory 808 can additionally store protocols and/or algorithms associated with estimating and/or utilizing a channel (e.g., performance based, capacity based, etc.).

It will be appreciated that the data store (e.g., memory 808) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 808 of the subject systems and methods is intended to comprise, without being limited to, these and any other suitable types of memory.

Processor 806 and/or receiver 802 can further be operatively coupled to a sector parameters measurer 810 that can receive and measure parameters of various surrounding sectors and/or related access points during cell reselection. For example, an access point related to a cell can be selected based at least in part on superior communication parameters (e.g., signal strength, services offered, billing schemes, and/or the like) as compared with a current access point or related cell. In addition, the processor 806 can be operatively coupled to an offset/hysteresis specifier 812 that can determine and apply offsets and/or hysteresis values to the measured parameters to positively or negatively affect certain access points for reselection. In one example, the offset/hysteresis specifier 812 can apply a positive offset to a measured access point to render related parameters more desirable for subsequent reselection (and hence expand coverage area for the access point). In another example, the offset/hysteresis specifier 812 can apply a negative offset to a measured access point to render related parameters less desirable for reselection.

Moreover, in one example, the offset/hysteresis specifier 812 can select and apply a hysteresis value to a current access point based on a type thereof. Thus, where the current access point is preferred, a larger hysteresis value can be applied, rendering higher measurements related thereto, to extend coverage of the current preferred access point. Where the access point is not preferred, the offset/hysteresis specifier 812 can select and apply a lower hysteresis value. It is to be appreciated that hysteresis values can be applied in either case to prevent frequent selection and reselection to/from access points. Mobile device 800 still further comprises a modulator 814 and transmitter 816 that respectively modulate and transmit signals to, for instance, a base station, another mobile device, etc. Although depicted as being separate from the processor 806, it is to be appreciated that the sector parameters measurer 810, offset/hysteresis specifier 812, demodulator 804, and/or modulator 814 can be part of the processor 806 or multiple processors (not shown).

Figure 9:
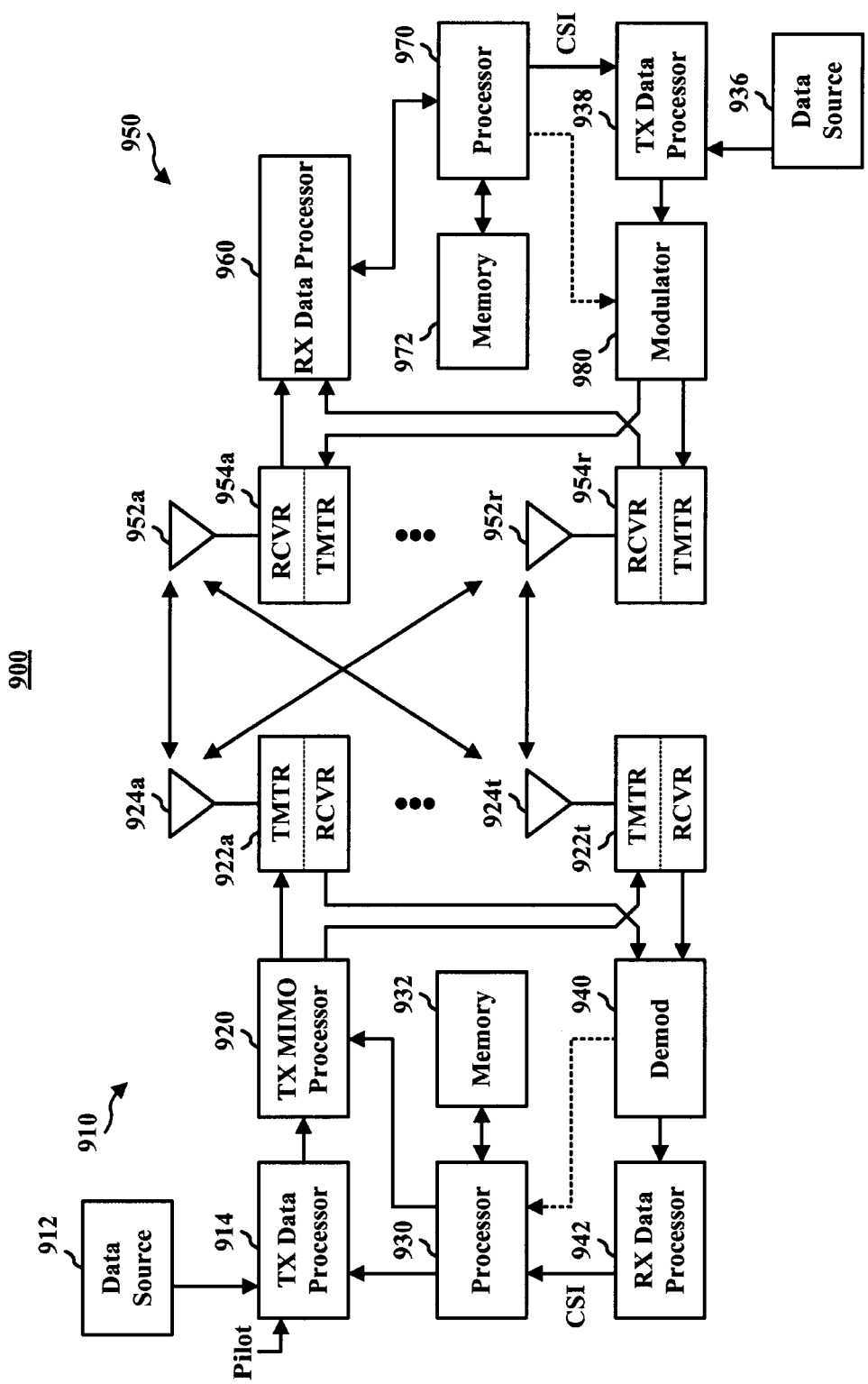
FIG. 9 is an illustration of an example wireless network environment that can be employed in conjunction with the various systems and methods described herein.

FIG. 9 shows an example wireless communication system 900. The wireless communication system 900 depicts one base station 910 and one mobile device 950 for sake of brevity. However, it is to be appreciated that system 900 can include more than one base station and/or more than one mobile device, wherein additional base stations and/or mobile devices can be substantially similar or different from example base station 910 and mobile device 950 described below. In addition, it is to be appreciated that base station 910 and/or mobile device 950 can employ the systems (FIGS. 1-4 and 8) and/or methods (FIGS. 5-7) described herein to facilitate wireless communication there between.

At base station 910, traffic data for a number of data streams is provided from a data source 912 to a transmit (TX) data processor 914. According to an example, each data stream can be transmitted over a respective antenna. TX data processor 914 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 950 to estimate channel response. The multiplexed pilot and coded data for each data stream can be modulated (e.g. symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 930.

The modulation symbols for the data streams can be provided to a TX MIMO processor 920, which can further process the modulation symbols (e.g., for OFDM). TX MIMO processor 920 then provides $N_T$ modulation symbol streams to $N_T$ transmitters (TMTR) 922a through 922t. In various embodiments, TX MIMO processor 920 applies beamforming weights to the symbols of the data streams and to the antenna from which the symbol is being transmitted.

Each transmitter 922 receives and processes a respective symbol stream to provide one or more analog signals, and further conditions (e.g. amplifies, filters, and upconverts) the analog signals to provide a modulated signal suitable for transmission over the MIMO channel. Further, $N_T$ modulated signals from transmitters 922a through 922t are transmitted from $N_T$ antennas 924a through 924t, respectively.

At mobile device 950, the transmitted modulated signals are received by $N_R$ antennas 952a through 952r and the received signal from each antenna 952 is provided to a respective receiver (RCVR) 954a through 954r. Each receiver 954 conditions (e.g., filters, amplifies, and downconverts) a respective signal, digitizes the conditioned signal to provide samples, and further processes the samples to provide a corresponding "received" symbol stream.

An RX data processor 960 can receive and process the $N_R$ received symbol streams from $N_R$ receivers 954 based on a particular receiver processing technique to provide $N_T$ "detected" symbol streams. RX data processor 960 can demodulate, deinterleave, and decode each detected symbol stream to recover the traffic data for the data stream. The processing by RX data processor 960 is complementary to that performed by TX MIMO processor 920 and TX data processor 914 at base station 910.

A processor 970 can periodically determine which preceding matrix to utilize as discussed above. Further, processor 970 can formulate a reverse link message comprising a matrix index portion and a rank value portion.

The reverse link message can comprise various types of information regarding the communication link and/or the received data stream. The reverse link message can be processed by a TX data processor 938, which also receives traffic data for a number of data streams from a data source 936, modulated by a modulator 980, conditioned by transmitters 954a through 954r, and transmitted back to base station 910.

At base station 910, the modulated signals from mobile device 950 are received by antennas 924, conditioned by receivers 922, demodulated by a demodulator 940, and processed by a RX data processor 942 to extract the reverse link message transmitted by mobile device 950. Further, processor 930 can process the extracted message to determine which precoding matrix to use for determining the beamforming weights.

Processors 930 and 970 can direct (e.g., control, coordinate, manage, etc.) operation at base station 910 and mobile device 950, respectively. Respective processors 930 and 970 can be associated with memory 932 and 972 that store program codes and data. Processors 930 and 970 can also perform computations to derive frequency and impulse response estimates for the uplink and downlink, respectively.

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 10:
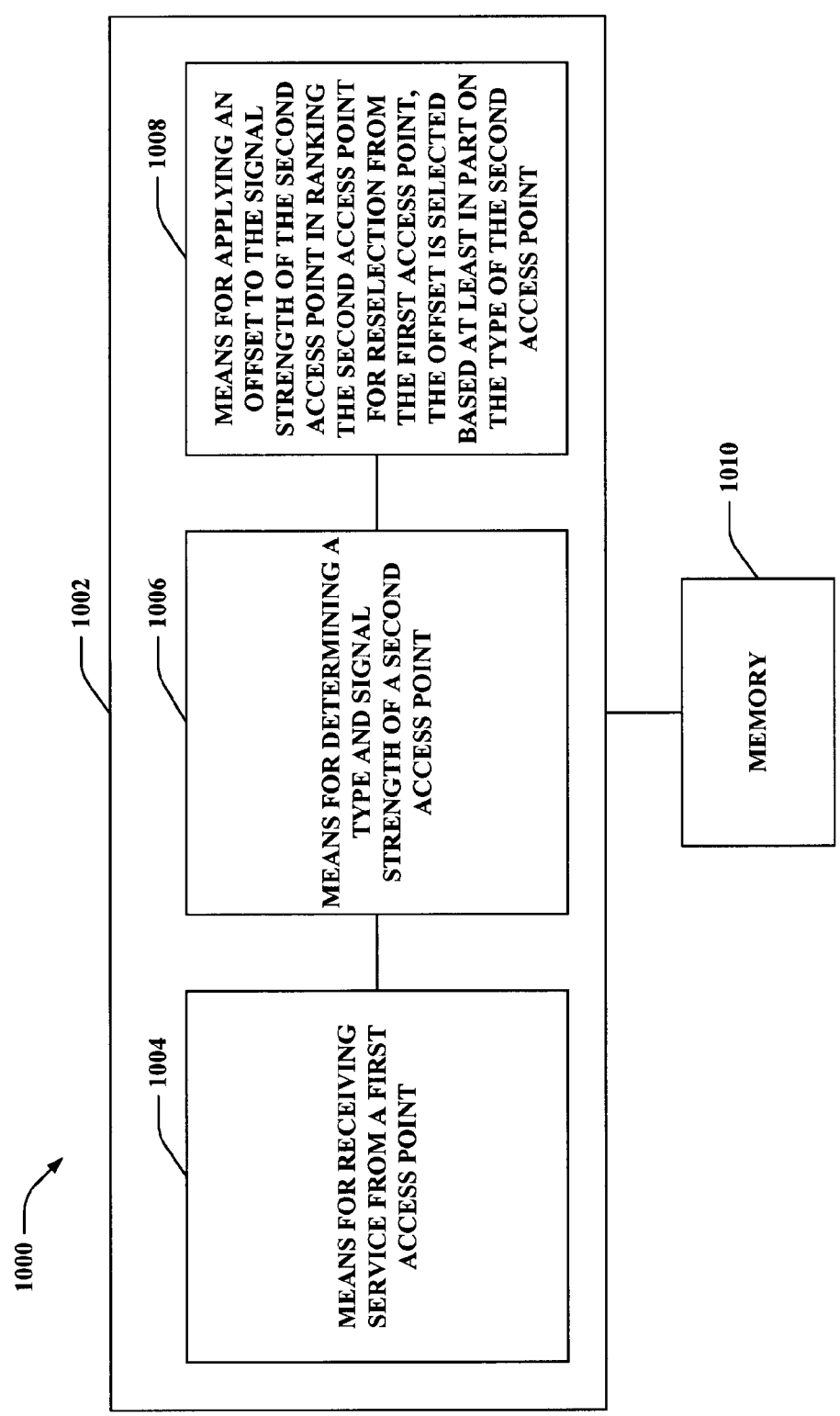
FIG. 10 is an illustration of an example system that applies an offset to a prospective access point measurement in cell reselection.

Turning to FIG. 10, illustrated is a system 1000 that applies offset values related to cell reselection in wireless networks. System 1000 can reside within a base station, femtocell, mobile device, etc., for instance. As depicted, system 1000 includes functional blocks that can represent functions implemented by a processor, software, or combination thereof (e.g., firmware). System 1000 includes a logical grouping 1002 of electrical components that act in conjunction. Logical grouping 1002 can include means for receiving service from a first access point 1004. For example, the service can relate to communicating with various devices in a wireless network, as described. Moreover, logical grouping 1002 can include means for determining a type and signal strength of a second access point 1006. This can be part of a cell reselection process, as described, where surrounding sectors and/or related access points are evaluated to determine whether cell reselection results in improved network access. Further, logical grouping 1002 can include means for applying an offset to the signal strength of the second access point for reselection from the first access point, the offset is selected based at least in part on the type of the second access point 1008. As described, the offset can be favorable to the second access point where the access point is preferred and/or of restricted association, for example. Thus, applying the offset can positively affect the measurements to extend coverage of the second access point. In another example, a negative offset can be similarly applied to mitigate cell reselection to the second access point where the access point is not preferred, for example. Additionally, system 1000 can include a memory 1010 that retains instructions for executing functions associated with electrical components 1004, 1006, and 1008. While shown as being external to memory 1010, it is to be understood that electrical components 1004, 1006, and 1008 can exist within memory 1010.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

What is claimed is:

1. A method for cell reselection in a wireless communication network, comprising:
receiving, by a mobile device, wireless communication service from a first access point;
determining, by the mobile device, a type and signal strength of a second access point, wherein the type of the second access point relates to whether the second access point is included in a maintained list of preferred access points;
verifying, by the mobile device, association of the second access point with the list;

selecting, by the mobile device, an offset based at least in part on whether the second access point is included in the maintained list of preferred access points; and applying, by the mobile device, the selected offset to the signal strength of the second access point in affecting a ranking of the second access point for cell reselection from the first access point.

2. The method of claim 1, further comprising applying a hysteresis value to a signal strength of the first access point based at least in part on a type of the first access point.

3. The method of claim 2, wherein the type of the first access point relates to whether the first access point is included in a maintained list of preferred access points.

4. The method of claim 2, further comprising receiving the hysteresis value from the first access point, the second access point, or a prior visited access point.

5. The method of claim 2, further comprising performing cell reselection to the second access point where the signal strength of the second access point modified by the offset exceeds the signal strength of the first access point modified by the hysteresis value.

6. The method of claim 5, wherein the cell reselection is performed while in an idle communication mode with respect to the wireless communication network.

7. The method of claim 2, further comprising performing cell reselection to a third access point where the signal strength of the second access point modified by the offset exceeds the signal strength of the first access point modified by the hysteresis value.

8. The method of claim 7, wherein the third access point is on a different frequency band from the second access point.

9. The method of claim 1, further comprising receiving the offset from the first access point, the second access point, or a prior visited access point.

10. The method of claim 1, wherein the determined type of the second access point includes a femtocell or a macrocell.

11. The method of claim 1, wherein the determined type of the second access point includes whether the second access point implements restricted or non-restricted association.

12. The method of claim 1, wherein the signal strength of the second access point is determined by tuning away from the first access point.

13. A mobile device, comprising:
at least one processor of the mobile device configured to:
receive wireless communication service from a first access point;
receive a type and signal strength for each of the first access point and a second access point, wherein the type of the second access point relates to whether the second access point is included in a maintained list of preferred access points;
verify association of the second access point with the list;
select an offset based at least in part on whether the second access point is included in the maintained list of preferred access points;
apply the selected offset to the signal strength of the second access point in affecting a ranking of the second access point for cell reselection from the first access point; and
apply a hysteresis to the signal strength of the first access point in ranking the second access point for reselection from the first access point, the hysteresis is selected based at least in part on a type of the first access point; and
a memory coupled to the at least one processor.

14. A mobile device that facilitates performing cell reselection by the mobile device to one or more access points, comprising:
means for receiving service from a first access point;
means for determining a type and signal strength of a second access point, wherein the type of the second access point relates to whether the second access point is included in a maintained list of preferred access points;
means for verifying association of the second access point with the list;
means for selecting an offset based at least in part on whether the second access point is included in the maintained list of preferred access points; and
means for applying the selected offset to the signal strength of the second access point in affecting a ranking of the second access point for reselection from the first access point.

15. A computer program product, comprising:
a non-transitory computer-readable medium of a mobile device comprising:
code for causing at least one computer to receive wireless communication service from a first access point;
code for causing the at least one computer to determine a type and signal strength of a second access point wherein the type of the second access point relates to whether the second access point is included in a maintained list of preferred access points;
code for causing the at least one computer to verify association of the second access point with the list;
code for causing the at least one computer to select an offset based at least in part on whether the second access point is included in the maintained list of preferred access points; and
code for causing the at least one computer to apply the selected offset to the signal strength of the second access point in affecting a ranking of the second access point for cell reselection from the first access point.

16. A mobile device, comprising:
a sector parameters measurer of the mobile device that measures a signal strength of one or more surrounding access points,
an access list controller of the mobile device that determines the type of the one or more surrounding access points based at least in part on presence of the one or more surrounding access points in a maintained list of preferred access points or related groups, and verifies association of the one or more surrounding access points with the list;
an access point offset specifier of the mobile device that selects and applies an offset to the signal strength of the one or more surrounding access points based at least in part on whether the second access point is included in the maintained list of preferred access points; and
a cell reselector of the mobile device that establishes communication with the one or more surrounding access points based at least in part on a ranking of the offset applied signal strength with respect to a current access point.

17. The mobile device of claim 16, further comprising an access point hysteresis specifier that applies a hysteresis value to a signal strength of the current access point based at least in part on a type of the current access point.

18. The mobile device of claim 17, wherein the type of the current access point relates to whether the current access point is included in a maintained list of preferred access points or related groups.

19. The mobile device of claim 17, wherein the access point hysteresis specifier receives the hysteresis value from the current access point, the one or more surrounding access points, or a prior visited access point.

20. The mobile device of claim 16, wherein the access point offset specifier receives the offset from the current access point, the one or more surrounding access points, or a prior visited access point.

21. The mobile device of claim 16, wherein the cell reselector establishes communication with the one or more surrounding access points while in an idle communication mode with respect to the current access point.

22. The mobile device of claim 6, wherein the cell reselector establishes communication with a disparate access point where the communication establishment is denied by the one or more surrounding access points.

23. The mobile device of claim 22, wherein the disparate access point is on a different frequency band from the one or more surrounding access points.

24. The mobile device of claim 16, wherein the type of the one or more surrounding access points includes a femtocell or a macrocell.

25. The mobile device of claim 16, wherein the type of the one or more surrounding access points includes whether the one or more surrounding access points have restricted or non-restricted association.

26. The mobile device of claim 16, wherein the signal strength of the one or more surrounding access points is determined by tuning away from the current access point.

* * * * *